(12) United States Patent
Ayabakan

(10) Patent No.: US 11,707,796 B2
(45) Date of Patent: *Jul. 25, 2023

(54) ULTRASONIC MACHINING DEVICE, METHOD FOR CONFIGURING AN ULTRASONIC MACHINING DEVICE, AND SYSTEM HAVING AN ULTRASONIC MACHINING DEVICE OF THIS TYPE

(71) Applicant: TELSONIC HOLDING AG, Bronschhofen (CH)

(72) Inventor: Mustafa Ayabakan, Wängi (CH)

(73) Assignee: TELSONIC HOLDING AG, Bronschhofen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 17/846,394

(22) Filed: Jun. 22, 2022

(65) Prior Publication Data

US 2022/0314361 A1 Oct. 6, 2022

Related U.S. Application Data

(63) Continuation of application No. 16/765,892, filed as application No. PCT/EP2017/080780 on Nov. 29, 2017, now Pat. No. 11,433,475.

(51) Int. Cl.
*B23K 20/10* (2006.01)
*B23K 31/12* (2006.01)
(Continued)

(52) U.S. Cl.
CPC .......... *B23K 20/106* (2013.01); *B23K 31/125* (2013.01); *B26D 7/086* (2013.01);
(Continued)

(58) Field of Classification Search
CPC ..... B23K 20/106; B23K 31/125; B26D 7/086
(Continued)

(56) References Cited

U.S. PATENT DOCUMENTS 7,475,801 B2 1/2009 Johansen et al.
2003/0198667 A1 10/2003 Franz et al.
(Continued)

FOREIGN PATENT DOCUMENTS

DE 10 2015 221 615 A1 5/2017
EP 0 786 323 A1 7/1997
(Continued)

OTHER PUBLICATIONS

International Search Report Corresponding to PCT/EP2017/080780 dated Aug. 27, 2018.
(Continued)

*Primary Examiner* — Allyson N Trail
(74) *Attorney, Agent, or Firm* — Finch & Maloney PLLC

(57) ABSTRACT

An ultrasonic machining device (1) for machining a workpiece. At least one component, selected from the group including a generator (11), a converter (12), a booster (13), a sonotrode (14), a HV cable (15), a machine frame (16) and a receiving device for the workpiece (17), is/are assigned an identifier (18). The identifier (18) characterizes at least one individual parameter of the component. The device (1) is assigned an input interface (19) which reads in the identifier (18) or generated data from the identifier. The device (1) is assigned a data processing arrangement (20). By way of the data processing arrangement (20), based on the read-in identifier (18) or the data generated from the identifier (18), at least one parameter of the device (1) is determined in such a way that the device (1) is operated in a target operating state, e.g., a resonant vibrating state.

26 Claims, 9 Drawing Sheets

(51) Int. Cl.
   *B26D 7/08* (2006.01)
   *G06K 19/06* (2006.01)
   *G06K 19/07* (2006.01)
   *G06K 19/077* (2006.01)

(52) U.S. Cl.
   CPC ... *G06K 19/06028* (2013.01); *G06K 19/0723* (2013.01); *G06K 19/07732* (2013.01)

(58) Field of Classification Search
   USPC .......................................................... 73/1.82
   See application file for complete search history.

(56) References Cited

U.S. PATENT DOCUMENTS

| | | |
|---|---|---|
| 2005/0011954 A1 | 1/2005 | Hennick et al. |
| 2008/0139974 A1 | 6/2008 | Da Silva |
| 2011/0056267 A1 | 3/2011 | Qin et al. |
| 2011/0106285 A1 | 5/2011 | Cateon et al. |
| 2013/0312370 A1 | 11/2013 | Mueller et al. |
| 2015/0029016 A1 | 1/2015 | Lesesky et al. |
| 2015/0226552 A1 | 8/2015 | Li et al. |
| 2016/0221108 A1 | 8/2016 | Hoffa et al. |
| 2016/0260053 A1 | 9/2016 | Barron et al. |
| 2018/0101759 A1 | 4/2018 | Forster |
| 2018/0200827 A1 | 7/2018 | Strobel et al. |
| 2019/0014406 A1 | 1/2019 | Qin |
| 2019/0224777 A1 | 7/2019 | Solenthaler |
| 2019/0264375 A1 | 8/2019 | Park et al. |
| 2020/0001536 A1 | 1/2020 | DeSimone et al. |
| 2020/0156311 A1 | 5/2020 | Rolland et al. |
| 2021/0354378 A1 | 11/2021 | Truong et al. |

FOREIGN PATENT DOCUMENTS

| | | |
|---|---|---|
| JP | 2003-048134 A | 2/2003 |
| JP | 2007-181826 | 7/2007 |

OTHER PUBLICATIONS

Written Opinion Corresponding to PCT/EP2017/080780 dated Aug. 27, 2018.

English translation of Japanese Office Action Corresponding to 2020-529169 dated Oct. 26, 2021.

ULTRASONIC MACHINING DEVICE, METHOD FOR CONFIGURING AN ULTRASONIC MACHINING DEVICE, AND SYSTEM HAVING AN ULTRASONIC MACHINING DEVICE OF THIS TYPE

This application is a Continuation of U.S. application Ser. No. 16/765,892 filed May 21, 2020, which is a National Stage completion of PCT/EP2017/080780 filed Nov. 29, 2017.

FIELD OF THE INVENTION

The invention relates to an ultrasonic machining apparatus, a method for configuring an ultrasonic machining apparatus and a system according to the preamble of the independent claims.

BACKGROUND OF THE INVENTION

It is known in the case of ultrasonic machining apparatuses that individual parameters of the components, for example of the generator, converter, booster, the sonotrode, the HV cable, the machine frame or the holding apparatus for the workpiece, influence the process parameters, in particular the resonance frequency and the frequency bandwidth usable during operation and/or the amplitude of the apparatus. During the production of all of these components, production tolerances mean that deviations inevitably occur. These deviations influence the process parameters, in particular the resonance frequency and the frequency bandwidth usable during operation and/or the amplitude of the ultrasonic machining apparatus. Thus, the ultrasonic machining apparatus needs to be recalibrated when any one of these components is replaced. The adjustment or calibration makes allowance for the actual dimensions of the components.

DE102015221615A1 discloses a system for automatically calibrating an ultrasonic welding apparatus, for example. The system contains a measuring unit for measuring an actual operating parameter and a computer. Calibration involves the ultrasonic welding apparatus being operated using at least one specified operating parameter on the basis of a calibration data memory. During this, the measuring unit measures the actual operating parameter. The actual operating parameter is then compared with the specified operating parameter, and if necessary a calibration of the ultrasonic welding apparatus is performed by adapting the specified data.

A disadvantage of the known ultrasonic welding apparatus is that the calibration needs to resort to complex measurements during the calibration process, and the process is thus slowed down.

EP0786323A1 discloses a method for interactively setting welding parameters on ultrasonic welding apparatuses on the basis of the welding work to be undertaken. The method sets the parameters by using an indication pertaining to the welding quality of a weld produced using an initial parameter. The aim is to allow automatic adjustment of the welding apparatus on the basis of the application.

A disadvantage of the known method is that an initial weld needs to be produced and the quality thereof needs to be assessed by a person.

US2003/0198667A1 discloses a welding device and a method for making a diagnosis for the same. The device comprises a sensor and a data memory. The data memory can contain information about the welding device, such as for example a serial number, a model number, the production date of the welding device, and information about components used in the welding device, such as for example a component part identifier or a component version identifier. On the basis of these data and data of the sensor (for example a current and voltage sensor), a diagnosis unit evaluates the state of the welding device. The diagnosis unit can subsequently take corrective measures.

A disadvantage of the known device is that allowance can be made for production tolerances of the components only indirectly by measuring the system configuration. The measurement slows down the system configuration.

SUMMARY OF THE INVENTION

It is the object of the present invention to provide an ultrasonic machining apparatus that avoids the disadvantages of the prior art, and in particular to provide a configuration method and a system in which it is ensured that the system is operated in a specified state.

The object is achieved by an ultrasonic machining apparatus and by a method for adjusting or calibrating the ultrasonic machining apparatus and a system according to the independent claims.

According to the invention, in an ultrasonic machining apparatus for machining a workpiece, at least one, in particular all, of the components selected from the list comprising generator, converter, booster, sonotrode, HV cable, machine frame and holding apparatus for the workpiece has an associated identifier. The identifier characterizes at least one individual parameter of the applicable component. Preferably, the identifier characterizes a parameter influencing the process parameters, in particular the resonant frequency and the frequency bandwidth usable during operation and/or the amplitude, in particular an electrical, acoustic or dimensional parameter. The apparatus has an associated input interface. By means of this input interface, the identifier or data produced on the basis of the identifier can be read in. The apparatus has an associated computing arrangement. By means of the computing arrangement, the read-in identifier or data produced from the identifier can to be taken as a basis for determining or setting at least one parameter of the apparatus such that the apparatus is operated in a specified operating state. This specified operating state is a resonant vibration state, in particular.

It is found to be advantageous that, by reading the identifier, the apparatus can thus be set to a specified operating state, without this requiring measurements during the setting. Measurement of individual parameters of the components during the adjustment or calibration is dispensed with. This allows the specified operating state to be set quickly, in particular. A measuring apparatus for measuring the components in situ is no longer necessary. Allowance can easily be made for individual parameters of the components during the adjustment or calibration by reading in the applicable identifier.

The frequency bandwidth is characterized by a lower and an upper limit frequency. The limit frequencies are chosen on the basis of dimensional, acoustic and electrical parameters of the ultrasonic machining apparatus. The frequency bandwidth thus corresponds to a frequency spectrum.

The amplitude is the amplitude of the mechanical vibration of the ultrasonic machining apparatus.

In one embodiment, the identifier is embodied as an RFID chip, smart code, bar code or USB stick.

RFID chips permit the storage of relatively large volumes of data in comparison with bar codes and permit the use of detailed identifiers and hence the coding of large volumes of data into the identifier. RFID chips also afford the advantage, besides the high data density, that they can easily be read automatically. The use of RFID chips thus allows the direct digital processing of the identifier. The RFID chip can also be read from a distance, and without needing to be visible, by means of an appropriate RFID reader. Thus, for example a central RFID reader can be mounted in the generator of the ultrasonic machining apparatus, this reader being able to be used to read the chips of all components of the ultrasonic machining apparatus even after the applicable components are installed.

A smart code is a two-dimensional arrangement of white and black elements. As a result of the two-dimensional arrangement of these elements, the smart code permits a higher data density than is permitted by bar codes, for example. The higher data density allows error-detecting elements, inter alia, to be integrated into the code, so that the latter can be read more reliably. The smart code is therefore also distinguished over the bar code by more reliable automatic readability and is particularly well suited for use with the ultrasonic machining apparatus.

The advantage of a bar code is found to be that it is easily readable automatically. Bar codes are therefore suitable for automatic processing of the identifier.

The identifier in the form of a USB stick affords the advantage that the identifier is digitally stored on the USB stick and thus can easily be processed further automatically. Additionally, the input interface of the apparatus can quite easily be in the form of a USB interface in the case of a USB identifier. It is also found to be advantageous that the USB stick is not arranged on the component itself and thus takes up no space thereon. Furthermore, the dimensions of the component are not influenced by the identifier, and thus the identifier is prevented from influencing the process parameters, in particular the resonance frequency and the frequency bandwidth usable during operation and/or the amplitude of the apparatus.

A parameter within the context of this application can also be a parameter set.

In one embodiment, the input interface is embodied as a USB interface, keyboard, touchscreen or as an RFID reader.

The computing arrangement can be arranged in the ultrasonic machining apparatus or can be arranged physically separately therefrom. Thus, the computing arrangement can be a smartphone, a computer, a server, for example, that is associated with the ultrasonic machining apparatus during operation by means of an appropriate application.

In a preferred embodiment, the individual parameter of the component is a parameter measured by the manufacturer following manufacture.

It is found to be advantageous that it is also possible for allowance to be made for production tolerances of the individual components during the system adjustment or system calibration without the need for a later measurement. This is of great significance for ultrasonic machining apparatuses, since even the smallest production tolerances of the components influence the specified operating state of the ultrasonic machining apparatus.

The measurement of the component can thus be performed directly after manufacture. Performing the measurement directly after manufacture permits this measurement to also be used for quality assurance for the manufacturing method.

In one embodiment, the individual parameter is an exact measured actual dimension, actual weight, actual imped-ance, actual frequency, amplitude transformation or a material type or a date of manufacture (age) of the component.

In a preferred embodiment, the individual parameter characterizes a deviation in the component in comparison with a specified state of this component.

This allows particularly simple handling of the individual parameters, since the parameter is thus a direct representation of the deviation to be corrected. The computing arrangement can thus process the individual parameter in a particularly simple fashion.

In a preferred embodiment, the identifier biuniquely determines the components.

This permits the exact component to be inferred from the identifier. Thus, not only is it possible for the welding apparatus to be calibrated on the basis of the individual parameter, it is also possible for evaluations about operation to be collected after the system is started up, these data being able to be associated with a specific component.

In a preferred embodiment, the input interface is embodied as a reading-in apparatus. The reading-in apparatus is connectable or connected to the computing arrangement.

This allows the identifier to be read in by the reading-in apparatus directly and therefore spares the user of the apparatus from having to input the identifier. The read-in identifier can be conveyed directly to the computing arrangement via the connection thereto.

The reading-in apparatus is embodied as an infrared scanner, as a camera, color sensor or as an RFID reader, for example.

In a preferred embodiment, the reading-in apparatus is embodied as part of an ultrasonic machining apparatus. It is found to be advantageous that the ultrasonic machining apparatus contains a reading-in apparatus, and the identifier can thus be effortlessly read in by the apparatus itself.

In a preferred embodiment, the computing arrangement and the reading-in apparatus are embodied in a common physical unit.

Preferably, the computing arrangement and/or the reading apparatus is embodied in the generator.

This means that the computing arrangement and/or the reading-in apparatus is arranged in direct proximity to the components to be calibrated. This allows short connecting paths between the computing arrangement and the reading-in apparatus and between the components to be calibrated. This allows an economical design of the apparatus and decreases the susceptibility of the transmission of the identifiers in the apparatus (for example by the RFID technology) to interference.

In a preferred embodiment, the computing arrangement has a data interface. The data interface is designed such that it allows remote maintenance. In particular, the data interface is supposed to allow remote adjustment or remote calibration of the ultrasonic machining apparatus. In particular, this is supposed to allow remote adjustment or remote calibration of the generator.

This allows computationally intensive processes to be performed on a remote computing arrangement. A remote computing arrangement is a computing arrangement that is physically separate from the ultrasonic machining apparatus, for example a computing arrangement in another room of a building or in another building. The computing arrangement in the ultrasonic machining apparatus can therefore be embodied smaller and hence in particular more economical. The data interface moreover allows constant monitoring of the ultrasonic machining apparatus remotely and also corrective intervention.

The data interface is embodied as a USB interface, Ethernet interface, WLAN interface, Bluetooth interface or NFC (Near Field Communication) interface in one embodiment.

In a preferred embodiment, the identifier is attached to the component.

This allows the identifier to be read shortly before the components are used in the ultrasonic machining apparatus. Thus, when a component is replaced, for example, the new component can already be unpacked and provided and the identifier read shortly before the new component is fitted. This allows the ultrasonic welding apparatus to be operated with a shorter profound down time.

In a preferred embodiment, the identifier is associated with the packaging of the component.

This allows, in particular in the case of small components, the identifier to be associated with the component, without this resulting in the component itself being impaired by the identifier in some way. This association of the identifier also allows the ultrasonic machining apparatus to be set up/altered and all of the identifiers to be read in only then. Thus, it is possible for the phase of replacement of the components and the phase of configuration/adjustment/calibration of the system to be separated in time. Thus, the resonant state of the ultrasonic apparatus is not influenced by the identifier/the identifiers.

The object is also achieved by a method for configuring an ultrasonic machining apparatus. The configuration is performed in particular after replacement of at least one of the components selected from the group comprising generator, converter, booster, sonotrode, HV cable, machine frame and holding apparatus for the tool. The method comprises the following steps: reading in an identifier. The identifier characterizes an individual parameter of the component. The identifier characterizes in particular a parameter influencing the process parameters, in particular the resonance frequency and the frequency bandwidth usable during operation and/or the amplitude of the apparatus. In particular, an electrical, acoustic or dimensional parameter is characterized by means of the identifier. The identifier is read in by means of a reading-in apparatus. In a further step, the read-in identifier or data produced from the identifier is/are taken as a basis for determining a parameter of the apparatus. The parameter allows the apparatus to be operated in a specified operating state. The specified operating state is a resonant vibration state, in particular. In a next step, the apparatus is adjusted in accordance with the at least one parameter. In particular, the frequency bandwidth and/or the amplitude of the generator is/are adapted.

This allows the ultrasonic machining apparatus to be configured solely on the basis of a read-in identifier or multiple read-in identifiers, without this requiring measurements in situ. This allows efficient configuration of the ultrasonic machining apparatus. The otherwise necessary step of measuring an operating state of the ultrasonic machining apparatus and subsequent comparison of the measured operating state with the specified operating state are dispensed with. Only the reading-in of the identifier is necessary, said identifier being taken as a basis for carrying out the adjustment or calibration.

In a preferred embodiment, the configuration method also comprises the steps of: conveying the identifier or data produced on the basis of the identifier to a physically separate computing arrangement. Subsequently, the parameter associated with the identifier is conveyed from the computing arrangement to the apparatus.

This permits the physically separate arrangement of the computing arrangement from the ultrasonic machining apparatus. It is thus possible for a central computing arrangement to be made available that stores and/or calculates the parameters and conveys them to the ultrasonic machining apparatus after the applicable identifier is received. The ultrasonic machining apparatus can thus be embodied without a powerful computing arrangement.

The central management of the parameters allows the evaluation of the different parameters and hence, among other things, conclusions about the production quality. Moreover, the time of the retrieval of the parameter can be recorded centrally and likewise analyzed. This permits statements concerning the performance of the apparatus and hence a conclusion about possible optimizations of the apparatus.

The object is also achieved by a method for manufacturing a component for an ultrasonic machining apparatus. The method comprises manufacturing a component. In a next step, the component produced is measured and the measurement is taken as a basis for producing a parameter set characterizing the component. In a next step, a biunique identifier is produced that is associated with the parameter set. In a further step, the identifier is associated with the component.

It is found to be advantageous that the component is thus measured directly after manufacture. Measuring the component during adjustment or calibration, that is to say at the place of use of the ultrasonic machining apparatus, is dispensed with. The measuring can thus be performed under ideal conditions at a place specifically equipped therefor by a professional using (complex) measuring apparatuses specifically designed therefor. In comparison with a measurement performed at the place of use of the ultrasonic machining apparatus by a user, such a measurement is more accurate and therefore permits the ultrasonic machining apparatus to be adjusted more accurately. This allows the apparatus to be operated with the same results. The measurement results can be handled in a simple manner as a result of being processed into a parameter set and as a result of this parameter set being associated with an identifier, which is in turn associated with the component. The additional supply of a detailed measurement report for the component when the latter is delivered is thus dispensed with. Intricately taking into consideration the measurement report when replacing the component is likewise dispensed with. A component manufactured using this method therefore allows simpler use of the component in an ultrasonic machining apparatus. The method can be used for manufacturing the generator, converter, booster, the sonotrode, the HV cable, machine frame and the holding apparatus for the workpiece.

The object is also achieved by a system. The system comprises at least one ultrasonic machining apparatus as described above and below. The system comprises a database as well. The system also comprises a communication interface between the ultrasonic machining apparatus and the database. This communication interface is used for conveying information between the ultrasonic machining apparatus and the database.

It is found to be advantageous that the database allows central storage, management, evaluation and control of data about the ultrasonic machining apparatus. In particular, this allows the ultrasonic machining apparatus itself to be made simpler, that is to say without a data memory.

In a preferred embodiment, the database allows an identifier associated with at least one component of the ultra sonic machining apparatus and a parameter set that characterizes the component to be linked.

This allows the association of a complex parameter set with a component on the basis of a simple identifier, which can be associated with the component.

In a further embodiment, the system also comprises a remote computing arrangement besides the remote database.

This permits the ultrasonic welding apparatus to be simplified further and the adjustment or calibration on the basis of the reading-in of identifiers described above and below to nevertheless be made possible.

BRIEF DESCRIPTION OF THE DRAWINGS

The invention is explained in more detail below on the basis of exemplary embodiments in figures, in which.

Figure 1:
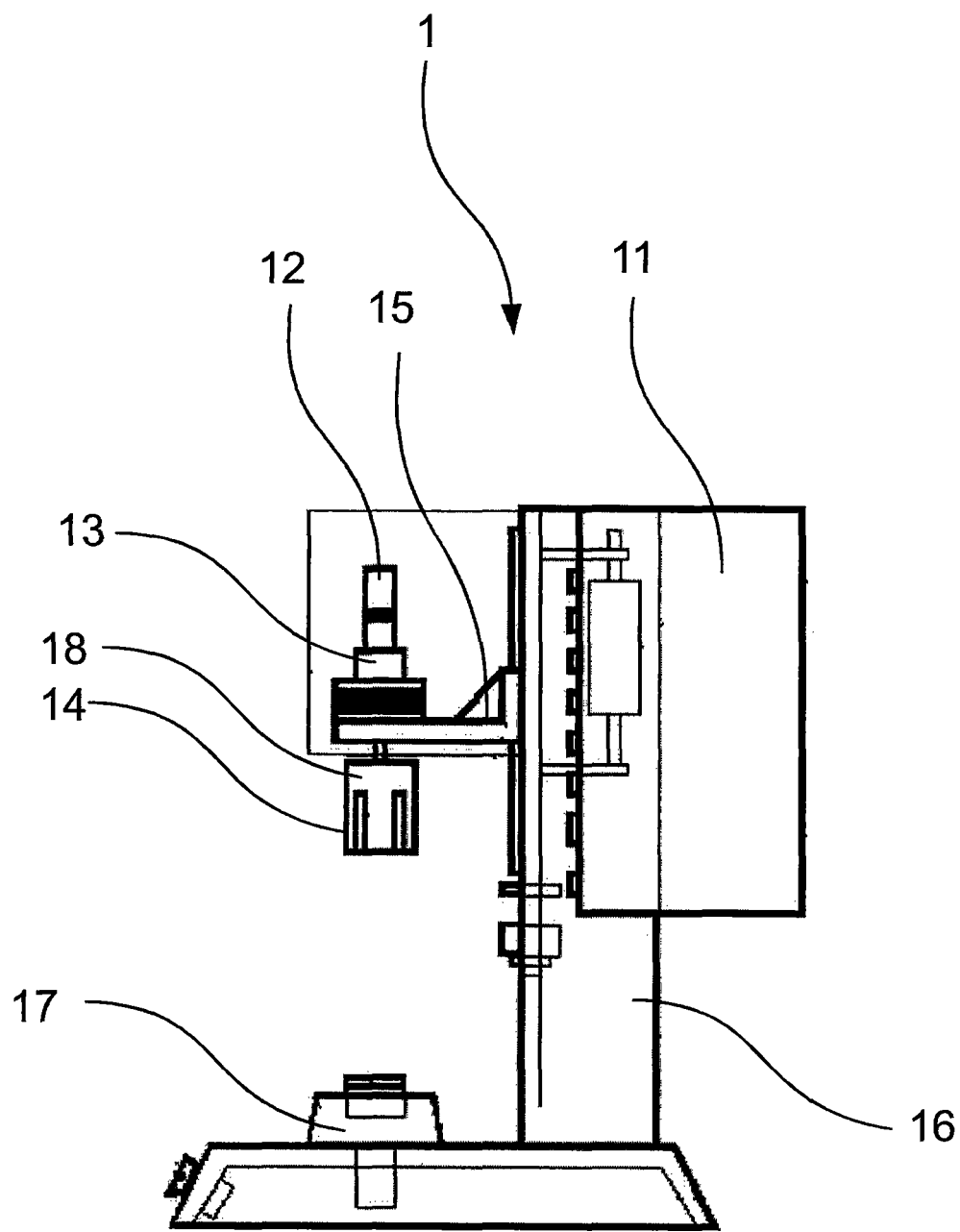
FIG. 1 shows a depiction of a first exemplary embodiment of the ultrasonic machining apparatus.

DETAILED DESCRIPTION OF THE PREFERRED EMBODIMENTS 1 shows a simplified view of a first exemplary embodiment of an ultrasonic machining apparatus 1 in the form of an ultrasonic welding apparatus. The ultrasonic welding apparatus 1 consists of multiple components. It comprises a generator 11, a converter 12, an HV cable 15, a booster 13, a sonotrode 14, a machine frame 16 and a holding apparatus 17 for the workpiece. The generator 11 is connected to the converter 12 via the HV cable 15. The generator 11 generates an electrical AC signal that is transmitted to the converter 12 via the HV cable 15 and thus powers the converter 12. The converter 12 converts the electrical AC signal into a mechanical vibration. This mechanical vibration is transmitted from the converter 12 to the booster 13. The booster 13 is designed such that it alters the amplitude of the vibration. The booster 13 transmits the mechanical vibration to the sonotrode 14, the sonotrode 14 subsequently transmitting this vibration to the workpiece. In this way, the workpiece is ultrasonically welded. The converter 12, booster 13 and the sonotrode 14 are held on the apparatus 1 by the machine frame 16.

In order to operate the ultrasonic welding apparatus 1 in the specified operating state, that is to say at resonance frequency, the components need to be precisely matched to one another. Since the components deviate from the specified dimensions owing to production tolerances, for example, replacement of a component needs to be followed by an adjustment of the ultrasonic welding apparatus 1. The adjustment takes into consideration the individual parameters (actual parameters) of the components and adjusts the ultrasonic welding apparatus 1 to these individual parameters. Thus, for example the frequency bandwidth and/or the amplitude of the electrical AC signal of the generator 11 can be adapted. The frequency of the AC signal is adapted by the adjustment of the generator such that the ultrasonic welding apparatus 1 is operated at resonance at a specific amplitude.

In the exemplary embodiment according to the invention, the sonotrode 14 has an identifier 18. The identifier 18 is linked to an individual parameter of the sonotrode 14. The adjustment of the ultrasonic welding apparatus 1 can thus be simplified by virtue of the identifier 18 being read in. For the purpose of adjustment, the identifier 18 is input by an input interface (see FIG. 5), as a result of which a statement about the individual form of the sonotrode 14 can be made on the basis of the identifier 18. This information is used to perform the adjustment. Thus, for example the identifier 18 associated with the sonotrode 14 can be taken as a basis for determining the actual dimensions of the sonotrode 14. These dimensions have been measured and linked to the identifier 18 after manufacture of the sonotrode 14. Thus, the dimensions can be ascertained on the basis of the identifier 18 and used for calculating the frequency bandwidth and/or amplitude. During the adjustment, the generator frequency is subsequently adapted for this calculated frequency bandwidth and/or amplitude.

Figure 2:
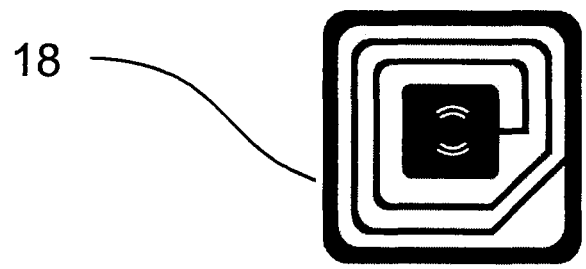
FIG. 2 shows depictions of a first exemplary embodiment of the identifier.

FIG. 2 schematically shows a first exemplary embodiment of an identifier 18 according to the invention. It is an RFID chip. RFID chips are well known from the prior art.

Figure 3:
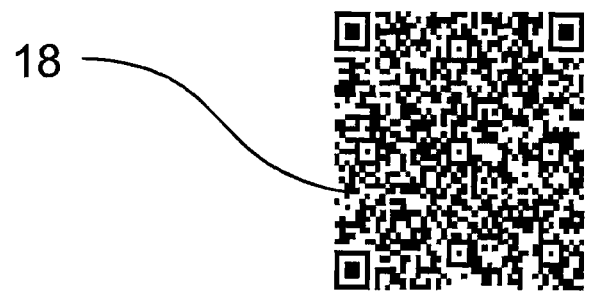
FIG. 3 shows a depiction of a second exemplary embodiment of the identifier.

FIG. 3 schematically shows a second exemplary embodiment of an identifier according to the invention. It is a smart code.

Figure 4:
FIG. 4 shows a depiction of a third exemplary embodiment of the identifier.

FIG. 4 schematically shows a third exemplary embodiment of an identifier 18 according to the invention. It is a bar code.

In a further exemplary embodiment (not shown), the identifier 18 is embodied as a USB stick, which is enclosed in the packaging, for example.

Figure 5:
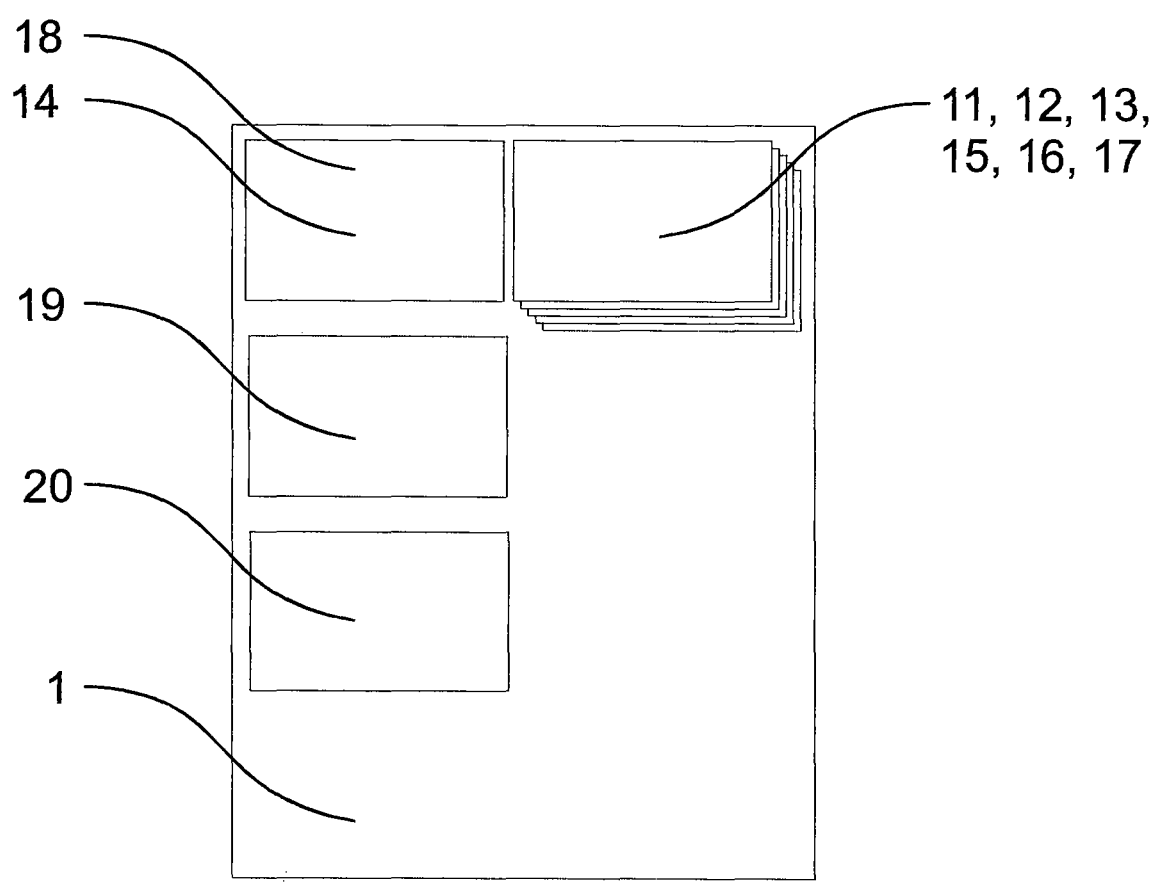
FIG. 5 shows a schematic depiction of the exemplary embodiment of the ultrasonic machining apparatus shown in FIG. 1.

FIG. 5 shows a schematic depiction of the exemplary embodiment of the ultrasonic welding apparatus 1 from FIG. 1. The apparatus 1 comprises the components generator 11, converter 12, booster 13, sonotrode 14, HV cable 15, machine frame 16 and holding apparatus 17 for the workpiece. In this exemplary embodiment, the sonotrode 14 is the only component to have an associated identifier 18. The apparatus 1 also comprises an input interface 19 and a computing arrangement 20. The input interface 19 allows input of the identifier 18, the computing arrangement 20 being used for processing the identifier 18 and for adjusting the apparatus 1. The input interface 19 is embodied as a USB interface in this exemplary embodiment. The identifier 18, which is embodied as a USB stick in this exemplary embodiment, can thus be introduced into the input interface 19 by a person operating the apparatus 1. The read-in identifier 18 is subsequently processed by the computing arrangement 20. The computing arrangement 20 takes the identifier 18 as a basis for ascertaining an individual parameter of the sonotrode 14. This parameter corresponds to the exact actual dimensions of the sonotrode 14 in this exemplary embodiment. The computing arrangement 20 uses these actual dimensions to calculate a frequency bandwidth and/or amplitude for the ultrasonic welding apparatus 1 and adapts the frequency bandwidth and/or amplitude of the generator 11 accordingly.

Figure 6:
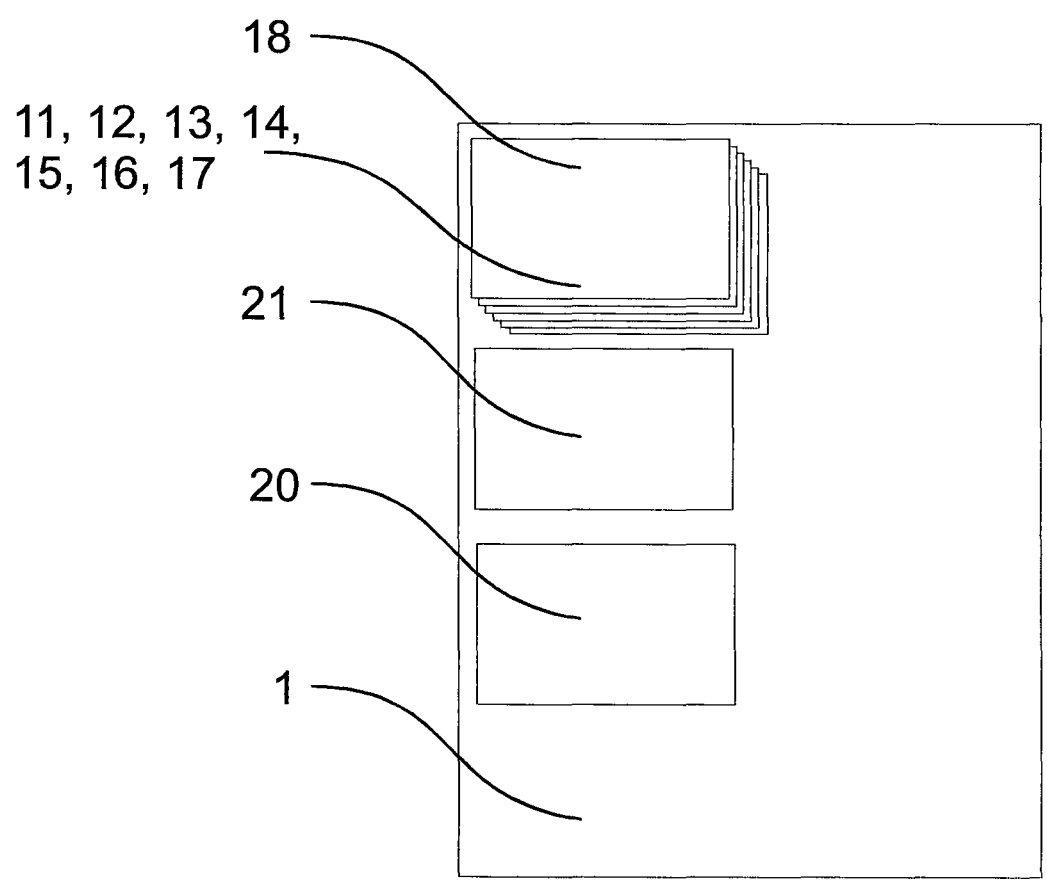
FIG. 6 shows a schematic depiction of a second exemplary embodiment of an ultrasonic machining apparatus according to the invention.

FIG. 6 shows a further exemplary embodiment of the ultrasonic welding apparatus 1. In this exemplary embodiment, all of the components, that is to say the generator 11, the converter 12, the booster 13, the sonotrode 14, the HV cable 15, the machine frame 16 and the holding apparatus 17 for the workpiece, have one identifier 18 each with various information. The input interface is embodied as a reading-in apparatus 21 in this exemplary embodiment. The reading-in apparatus 21 is an RFID reader. The identifiers 18 are attached directly to the components as RFID chips. The identifiers 18 of the components can thus be read in by the reading-in apparatus 21. The reading-in apparatus 21 forwards the identifiers 18 to the computing arrangement 20. The computing arrangement 20 takes the identifiers 18 as a basis for determining the individual parameters of the components 11, 12, 13, 14, 15, 16, 17, so that the computing arrangement 20 can subsequently calculate a frequency bandwidth and/or amplitude adapted for the individual components. The computing arrangement 20 conveys the calculated frequency bandwidth and/or amplitude to the generator 11, which adapts its output signal accordingly.

Figure 7:
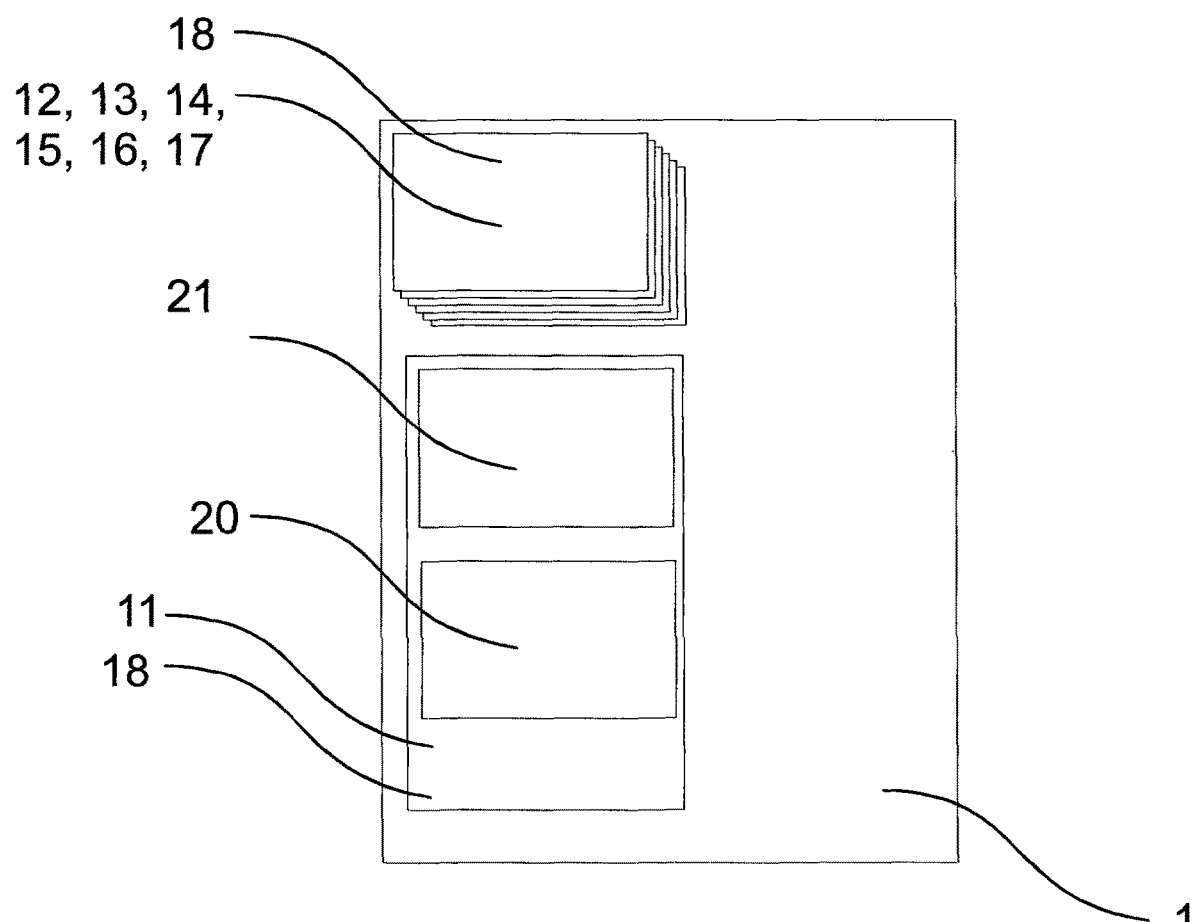
FIG. 7 shows a schematic depiction of a third exemplary embodiment of an ultrasonic machining apparatus according to the invention.

FIG. 7 shows a further exemplary embodiment of the ultrasonic welding apparatus 1 according to the invention. In this exemplary embodiment, the computing arrangement 20 and the reading apparatus 21 are integrated in the generator 11 of the apparatus 1. Each component 11, 12, 13, 14, 15, 16, 17 has an associated biunique identifier 18.

Figure 8:
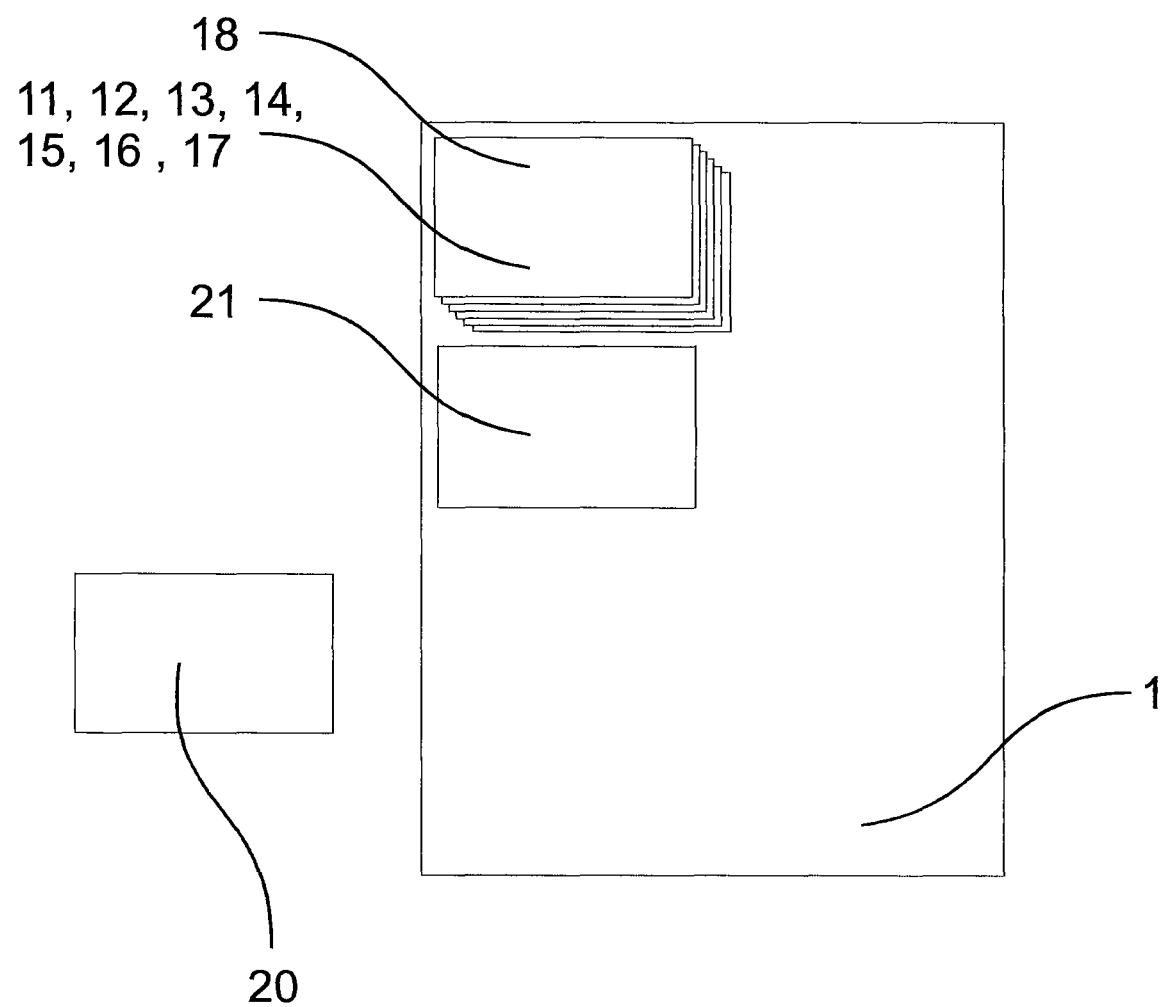
FIG. 8 shows a schematic depiction of a fourth exemplary embodiment of an ultrasonic machining apparatus according to the invention.

FIG. 8 shows a further exemplary embodiment of an ultrasonic welding apparatus 1 according to the invention. In this exemplary embodiment, the computing arrangement 20 is arranged outside the apparatus 1, that is to say remotely from the apparatus. The reading-in apparatus 21 is arranged in the ultrasonic welding apparatus 1 in this exemplary embodiment.

Figure 9:
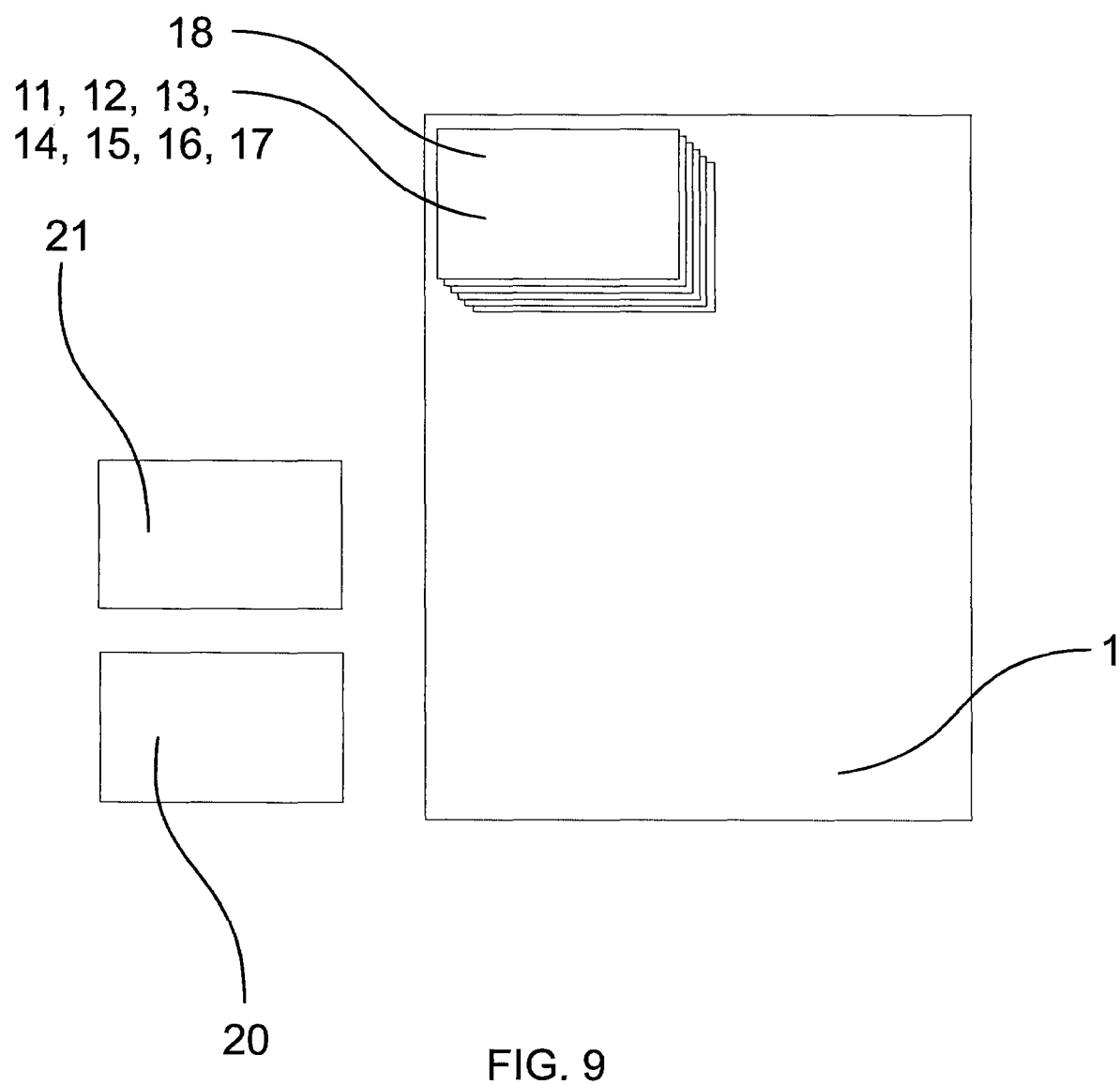
FIG. 9 shows a schematic depiction of a fifth exemplary embodiment of an ultrasonic machining apparatus according to the invention.
Figure 10:
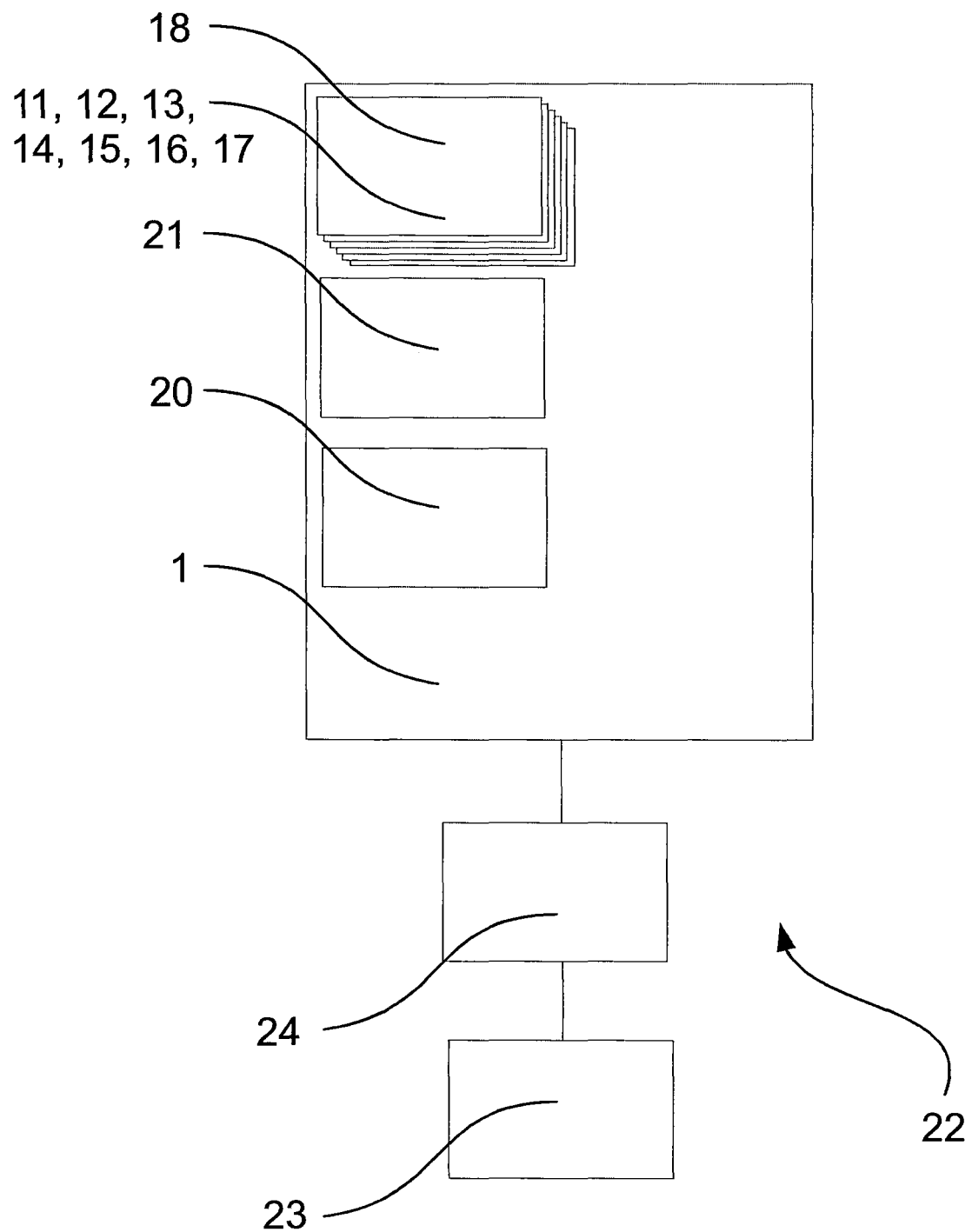
FIG. 10 shows a schematic depiction of a sixth exemplary embodiment of an ultrasonic machining apparatus according to the invention.
Figure 11:
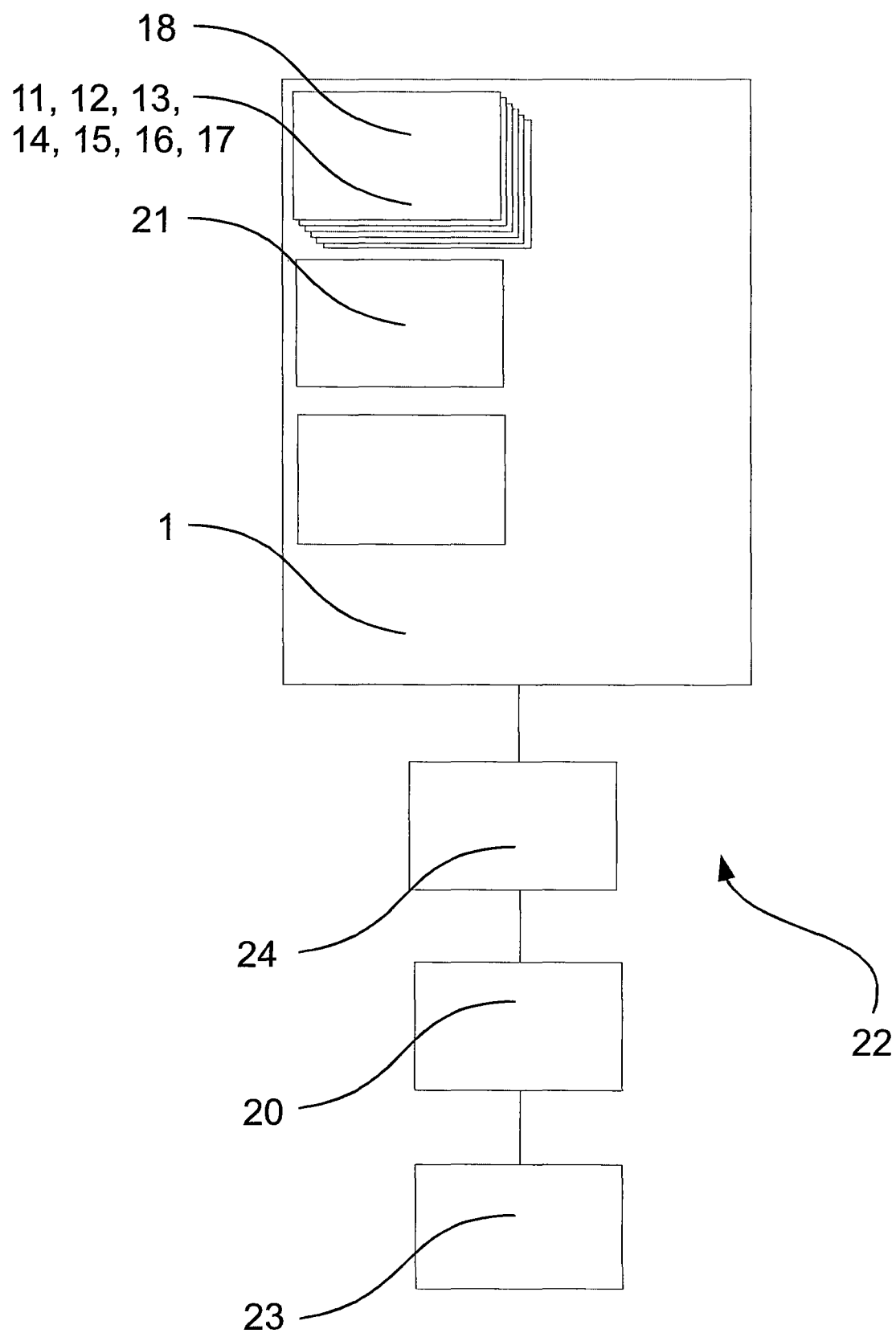
FIG. 11 shows a schematic depiction of a seventh exemplary embodiment of an ultrasonic machining apparatus according to the invention.

FIG. 9 shows a further exemplary embodiment of the ultrasonic welding apparatus 1, wherein the computing arrangement 20 and the reading-in apparatus 21 are arranged outside the ultrasonic welding apparatus 1 in this example.

The invention claimed is:

1. An ultrasonic machining apparatus for machining a workpiece,
wherein at least one component of the ultrasonic machining apparatus is selected from the group consisting of a generator, a converter, a booster, a sonotrode, an HV cable, a machine frame, and a holding apparatus for the workpiece, wherein the component has an associated identifier which is associated with an individual parameter that characterizes the component,
the apparatus has an associated input interface by which the identifier or data generated on a basis of the identifier can be read in, and
the apparatus has an associated computing arrangement by which the read-in identifier or data generated from the identifier can be taken as a basis for determining at least one parameter of the apparatus such that the apparatus is operated in a specified operating state.

2. The ultrasonic machining apparatus according to claim 1, wherein the individual parameter of the component is a parameter measured after said component is manufactured.

3. The ultrasonic machining apparatus according to claim 1, wherein the individual parameter the component characterizes a deviation in the component in comparison with a specified state of this component.

4. The ultrasonic machining apparatus according to claim 1, wherein the identifier biuniquely determines the component.

5. The ultrasonic machining apparatus according to claim 1, wherein the input interface is embodied as a reading-in apparatus, and the reading-in apparatus is connectable to the computing arrangement.

6. The ultrasonic machining apparatus according to claim 1, wherein the reading-in apparatus is embodied as a component of the ultrasonic machining apparatus.

7. The ultrasonic machining apparatus according to claim 1, wherein the computing arrangement and/or the reading-in apparatus are embodied in one component.

8. The ultrasonic machining apparatus according to claim 7, wherein the computing arrangement and/or the reading-in apparatus are embodied in the generator.

9. The ultrasonic machining apparatus according to claim 1, wherein the computing arrangement has a communication interface designed such that the communication interface allows remote maintenance of the ultrasonic machining apparatus.

10. The ultrasonic machining apparatus according to claim 9, wherein the communication interface is designed such that the communication interface allows remote maintenance the generator.

11. The ultrasonic machining apparatus according to claim 1, wherein the identifier is attached to the component.

12. The ultrasonic machining apparatus according to claim 1, wherein the identifier is associated with packaging of the component.

13. The ultrasonic machining apparatus according to claim 1, wherein the parameter is a parameter influencing the process parameters.

14. The ultrasonic machining apparatus according to claim 13, wherein the parameter is the resonant frequency and the frequency bandwidth usable during operation and/or amplitude of the apparatus.

15. The ultrasonic machining apparatus according to claim 14, wherein the apparatus is operated in a resonant vibration state.

16. A method for configuring an ultrasonic machining apparatus,
wherein the apparatus contains a component selected from the group consisting of a generator, a converter, a booster, a sonotrode, an HV cable, a machine frame, and a holding apparatus for the workpiece,
wherein the method comprises the following steps:
reading in, by a reading-in apparatus, an identifier which is associated with an individual parameter that characterizes the component;
determining a parameter of the apparatus on a basis of the read-in identifier or on a basis of the data generated from the identifier, wherein the parameter allows the apparatus to be operated in a specified operating state; and
adjusting the apparatus in accordance with the at least one parameter.

17. The method according to claim 16, wherein the parameter is a parameter influencing the process parameters.

18. The method according to claim 16, wherein the parameter is the resonant frequency and the frequency bandwidth usable during operation and/or amplitude of the apparatus.

19. The method according to claim 16, wherein the apparatus is operated in a resonant vibration state.

20. The method according to claim 16, wherein a frequency range and/or an amplitude of the generator is/are adapted.

21. The method according to claim 16, wherein the method also comprises the steps of:
conveying the identifier or the data generated on a basis of the identifier to a computing arrangement; and
conveying the parameter determined on a basis of the identifier from the computing arrangement to the apparatus.

22. A method for manufacturing a component for an ultrasonic machining apparatus, comprising the steps of:
producing the component;
measuring the component and generating a parameter characterizing the component;
generating a unique identifier associated with the parameter; and
associating the identifier with the component.

23. A system having:
at least one ultrasonic machining apparatus according to claim 1;
a database; and
a communication interface between the ultrasonic machining apparatus and the database for conveying information between the ultrasonic machining apparatus and the database.

24. The system according to claim 23, wherein the database allows an identifier associated with at least one of the components of the ultrasonic machining apparatus and a data record that characterizes the component to be linked.

25. The method as claimed in claim 22, wherein the measurement is taken as a basis for producing the parameter which characterizes the component.

26. The method as claimed in claim 22, wherein the component is selected from the group consisting of a generator, a converter, a booster, a sonotrode, an HV cable, a machine frame, and a holding apparatus for the workpiece.

* * * * *